(12) United States Patent
Yamamoto et al.

(10) Patent No.: US 11,931,712 B2
(45) Date of Patent: Mar. 19, 2024

(54) FUEL SYNTHESIS DEVICE

(71) Applicant: HONDA MOTOR CO., LTD., Tokyo (JP)

(72) Inventors: Osami Yamamoto, Wako (JP); Hideaki Yoneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/152,568

(22) Filed: Jan. 10, 2023

(65) Prior Publication Data

US 2023/0219051 A1   Jul. 13, 2023

(30) Foreign Application Priority Data

Jan. 12, 2022  (JP) .................................. 2022-003387

(51) Int. Cl.
| | | |
|---|---|---|
| *B01J 19/00* | (2006.01) | |
| *C10G 2/00* | (2006.01) | |
| *C10L 1/06* | (2006.01) | |

(52) U.S. Cl.
CPC ............ *B01J 19/0033* (2013.01); *C10G 2/50* (2013.01); *C10L 1/06* (2013.01);
(Continued)

(58) Field of Classification Search
CPC ...... B01J 19/0033; B01J 12/007; B01J 8/001; B01J 8/02; B01J 2219/00164;
(Continued)

(56) References Cited

U.S. PATENT DOCUMENTS

| | | |
|---|---|---|
| 2010/0177861 A1 | 7/2010 | Lecomte et al. |
| 2013/0345325 A1 | 12/2013 | Lecomte et al. |
| 2015/0126629 A1 | 5/2015 | Chen et al. |

FOREIGN PATENT DOCUMENTS

| | | |
|---|---|---|
| JP | 2014517806 A | 7/2014 |
| JP | 6097828 B2 | 3/2017 |

(Continued)

OTHER PUBLICATIONS

Decision to Grant a Patent from Corresponding Japanese Application No. JP 2022-003387 dated Sep. 19, 2023, 5 pages.

(Continued)

*Primary Examiner* — Lessanework Seifu
(74) *Attorney, Agent, or Firm* — Rankin, Hill & Clark LLP

(57) ABSTRACT

A fuel synthesis device includes: a supplier to supply $CO_2$ and $H_2$ gasses; a fuel synthesis catalyst to chemically react the $CO_2$ and $H_2$ gasses to synthesize fuel; a gas-liquid separator to liquefy the fuel into liquid and separate the liquid from a gas containing unreacted $CO_2$ and $H_2$ gasses, and $CH_4$ gas as a side product; a return path to return the separated gas to a point between the supplier and the fuel synthesis catalyst; a bypass path to bypass, and merge downstream of, the return path, and to include a $CH_4$ separator to separate the $CH_4$ and a $CH_4$ oxidation catalyst to oxidize the $CH_4$; and a switching valve to selectively switch between communication with the return path and communication with the bypass path, wherein whether the switching valve communicates with the return path or bypass path is controlled based on the density of $CH_4$.

3 Claims, 3 Drawing Sheets

(52) U.S. Cl.
CPC ............... *B01J 2219/00164* (2013.01); *B01J 2219/00171* (2013.01); *B01J 2219/00186* (2013.01); *C10L 2230/04* (2013.01); *C10L 2290/60* (2013.01)

(58) Field of Classification Search
CPC .. B01J 2219/00171; B01J 2219/00186; C10G 2/50; C10G 2/30; C10G 2300/4056; C10G 2300/70; C10L 1/06
See application file for complete search history.

(56) References Cited

FOREIGN PATENT DOCUMENTS

| | | |
|---|---|---|
| WO | 2021228774 A1 | 11/2021 |
| WO | 2022264836 A1 | 12/2022 |

OTHER PUBLICATIONS

Launching R and D of Integrated Process Technology for Production of Liquid Synthetic Fuel from CO2, 4 pages, Date available (2021).

FUEL SYNTHESIS DEVICE

CROSS-REFERENCE TO RELATED APPLICATION

This application claims the benefit of priority to Japanese Patent Application No. 2022-003387 filed on Jan. 12, 2022, the disclosures of all of which are hereby incorporated by reference in their entireties.

TECHNICAL FIELD

The present invention relates to a fuel synthesis device to synthesize fuel from hydrogen and carbon dioxide.

BACKGROUND OF THE INVENTION

In order to reduce a negative impact on the global environment, regulation has been tightening on exhaust gas from vehicles. The FT (Fischer-Tropsch) method is widely known as a technique to synthesize gasoline as a fuel from hydrogen ($H_2$) and carbon dioxide ($CO_2$) which is contained in exhaust gas and the atmosphere. The FT method is used to synthesize hydrocarbon from carbon monoxide (CO) and $H_2$, with catalytic reaction. The synthesis of hydrocarbon with the FT method is a kind of polymerization reaction in which carbon chain grows through the reaction. In the FT method, the following reaction occurs (Equation (1) below).

$$nCO+(2n+1) H_2 \rightarrow C_nH_{2n}+nH_2O \quad (1)$$

Conventionally, when gasoline (hydrocarbon with 5 carbons or more ($C_{5+}$)) is synthesized with the FT method, $CO_2$ contained in exhaust gas or in the atmosphere has been converted to CO by a reverse aqueous gas shift reaction (Equation (2) below) and then used in Equation (1) above.

$$CO_2+H_2 \rightarrow CO+H_2O \quad (2)$$

Much research has been done recently to improve efficiency of the FT method, to propose direct synthesis (Direct-FT) as an innovative technique (see Hiroaki Ishizuka, "Commencing research and development of integrated process technology for producing liquid synthetic fuel from CO2," [online], Feb. 22, 2021, New Energy and Industrial Technology Development Organization, [retrieved on Dec. 20, 2021], Internet <URL: https://www.nedo.go.jp/news/press/AA5_101410.html>, for example). Direct-FT implements the reverse shift reaction and FT synthesis reaction simultaneously in the presence of a catalyst, to produce hydrocarbon directly from $CO_2$ and $H_2$ (Equation (3) below, FIG. 3). Note that FIG. 3 shows fuel (gasoline) synthesis mechanism in the Direct-FT.

$$nCO_2+mH_2 \rightarrow C_nH_{2(m-2n)}+2nH_2O \quad (3)$$

As shown in FIG. 3, $CO_2$ is transformed into intermediates of CO and $CH_2$ by $H_2$ on the surface of a catalyst (e.g., Na—$Fe_3O_4$/HZSM-5 catalyst), and is then formed into hydrocarbon of $C_{5+}$ (gasoline). In the process, $H_2O$ is produced as a side product. In addition, hydrocarbon of 4 or less carbons ($C_{1-4}$), including methane ($CH_4$), is produced as a side product at low temperatures or under lean $H_2$ conditions, due to variation in temperature regulation associated with instability of feed rates.

The FT method or Direct-FT causes a carbon chain to grow by circulating hydrocarbon of $C_{1-4}$ and reacting them again with a catalyst to form hydrocarbon of $C_{5+}$. However, hydrocarbon of $C_{1-4}$, especially $CH_4$, has low reactivity to cause a carbon chain less likely to grow, so that circulation just keeps density of said hydrocarbon increasing in a reaction system (within a device).

$CH_4$ gas has a high Global Warming Potential (GWP) and should not easily be released into the atmosphere. $CH_4$ can be used for city gas, but this requires further refining at refineries or the like and cannot be easily done. In order to reduce the negative impact on the global environment, it is preferable to effectively utilize $CH_4$ in addition to $CO_2$.

Under these circumstances, a technique is disclosed in which the $CH_4$ produced in an FT synthesis reactor by the FT method is sent to a reforming reactor to have a reforming reaction between $CH_4$ and water vapor ($H_2O$) through the action of a reforming catalyst, so as to be converted into $H_2$ and CO (see Japanese Patent No. 6097828, referred to as Patent Document 1 hereinbelow, for example). Note that Patent Document 1 describes that the H2 obtained by the conversion is fed to an FT synthesis reactor so as to be used as a feedstock for hydrocarbon of $C_{5+}$. Patent Document 1 meanwhile describes that CO obtained by the conversion is fed to the reforming reactor so as to be used as an auxiliary fuel for the reforming reactor.

SUMMARY

Problems to be Solved

The technique described in Patent Document 1 supplies CO to the reforming reactor, so that the amount of C in the reforming reactor continues to increase. Meanwhile, C in the feed gas supplied to the FT synthesis reactor must be newly supplied separately. In other words, the technique described in Patent Document 1 has a room for improvement in terms of effective utilization of hydrocarbon of $C_{1-4}$ generated as a side product, particularly $CH_4$.

The present invention has been made in view of above-described situation and is intended to provide a fuel synthesis device to synthesize fuel by effectively utilizing $CH_4$ produced as a side product.

Solution to Problem

To solve the above-identified problem, a first aspect of the present invention provides a fuel synthesis device including: a supplier arranged upstream of a main path and configured to supply $CO_2$ gas and $H_2$ gas; a fuel synthesis catalyst located downstream of the supplier and configured to chemically react the $CO_2$ gas and the $H_2$ gas to synthesize fuel; a gas-liquid separator arranged downstream of the fuel synthesis catalyst and configured to liquefy the fuel into liquid and separate the liquid from a gas containing the $CO_2$ gas and the $H_2$ gas, which have not yet reacted with the fuel synthesis catalyst, and gas of $CH_4$ as a side product; a return path configured to return the gas separated by the gas-liquid separator to a point between the supplier and the fuel synthesis catalyst; a bypass path configured to bypass, and merge downstream of, the return path, and including a $CH_4$ separator to separate the $CH_4$ and a $CH_4$ oxidation catalyst to oxidize the $CH_4$ separated by the $CH_4$ separator; a switching valve provided at a junction of the return path and the bypass path and configured to selectively switch between communication with the return path and communication with the bypass path; and a $CH_4$ density detector arranged in the return path and configured to detect density of $CH_4$ contained in the gas separated by the gas-liquid separator, wherein whether the switching valve communicates with the return path or the bypass path is controlled based on the density of $CH_4$ detected by the $CH_4$ density detector.

Thus, the first aspect of the present invention controls the switching valve based on the density of $CH_4$, staying in the fuel synthesis device, to cause $CH_4$ to be partially oxidized and return gas (CO) produced by oxidation to the point upstream of the fuel synthesis catalyst (between the supplier and the fuel synthesis catalyst). This allows the first aspect of the present invention to use CO as a feedstock in the fuel synthesis catalyst to synthesize fuel (hydrocarbon of $C_{5+}$) for sufficiently growing carbon chain.

A second aspect of the present invention provides the fuel synthesis device according to the first aspect, wherein the switching valve is controlled to communicate with the bypass path, on the condition that the density of $CH_4$ detected by the $CH_4$ density detector becomes equal to or greater than a predetermined value at which synthesis of the fuel is blocked.

The second aspect of the present invention thus causes the $CH_4$ remaining in the fuel synthesis device to be partially oxidized and returns the gas (CO) produced by oxidation to the point upstream of the fuel synthesis catalyst, on the condition that density of the $CH_4$ increases to become equal to or greater than the predetermined value at which synthesis of the fuel is blocked. This allows the second aspect of the present invention to use CO as a feedstock in the fuel synthesis catalyst to synthesize fuel (hydrocarbon of $C_{5+}$) for sufficiently growing carbon chain.

A third aspect of the present invention provides the fuel synthesis device according to the first or second aspect, wherein the supplier further has a function of supplying $O_2$ gas, and the fuel synthesis device includes: a calculator configured to calculate an amount of $O_2$ required for oxidation, based on the density of $CH_4$ detected by the $CH_4$ density detector; and an $O_2$ supplier configured to supply the $O_2$ gas from the supplier to the $CH_4$ oxidation catalyst, based on the amount of $O_2$ calculated by the calculator.

$O_2$ is required to partially oxidize $CH_4$. The third aspect of the present invention uses the calculator to calculate the amount of $O_2$ required for oxidation, based on the density of $CH_4$, and uses the $O_2$ supplier to supply $O_2$ to the $CH_4$ oxidation catalyst from the supplier. This allows the third aspect of the present invention to supply the required amount of $O_2$ to the $CH_4$ oxidation catalyst to partially oxidize the required amount of $CH_4$, without addition of any other specific supplier.

Advantageous Effects of the Invention

The present invention provides a fuel synthesis device to synthesize fuel by effectively utilizing $CH_4$ produced as a side product.

DETAILED DESCRIPTION

Figure 1:
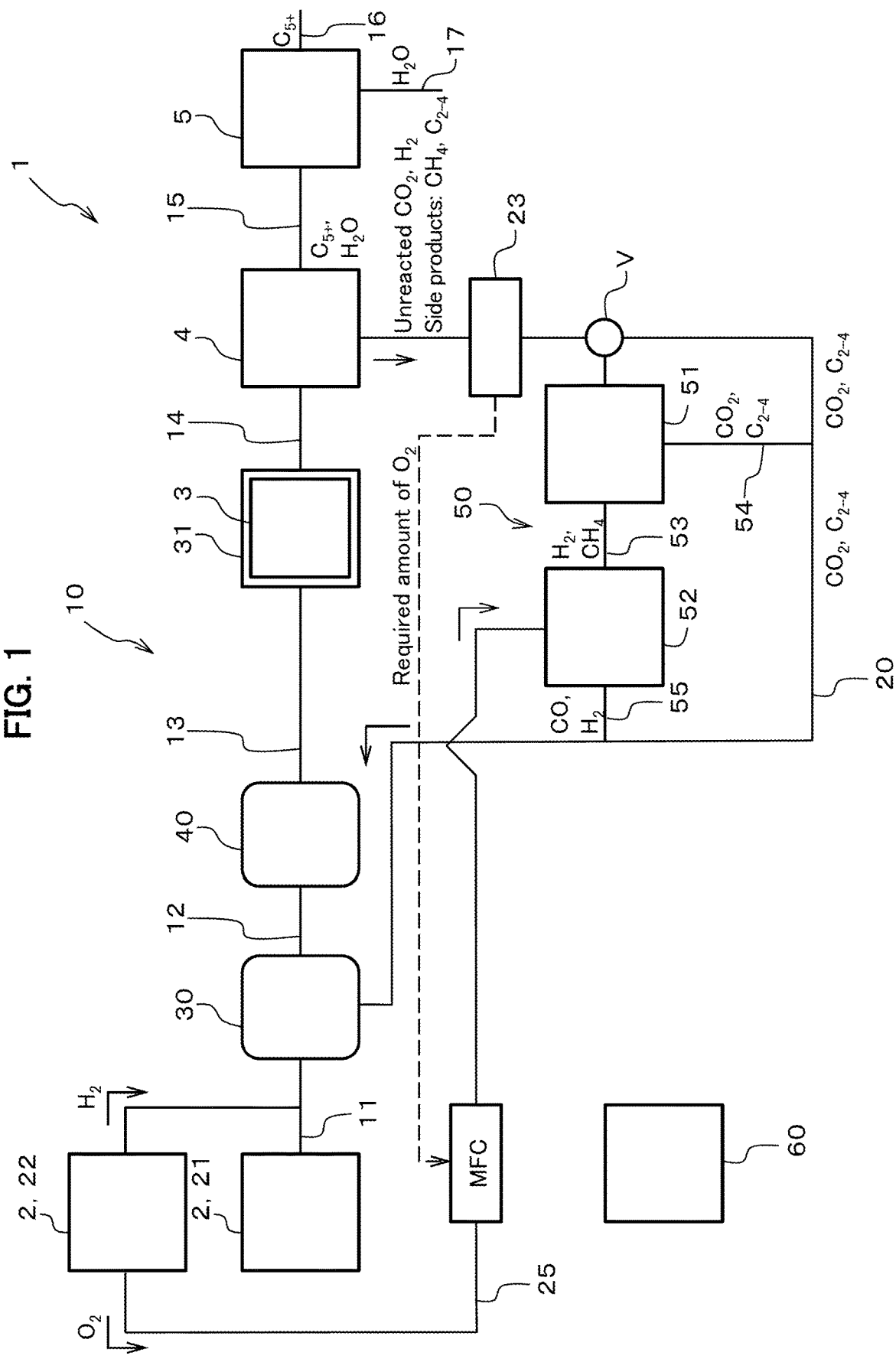
FIG. 1 shows a schematic configuration of a fuel synthesis device according to a present embodiment.

Hereinafter, a description is given in detail of a fuel synthesis device 1 according to an embodiment of the present invention, with reference to the drawings as required. Note that the wordings of upstream and upstream side, and downstream and downstream side in the following description respectively represent an upstream side and a downstream side in a flow direction of fluid flowing into a described device. FIG. 1 of the referenced drawings shows a schematic configuration of the fuel synthesis device 1 according to the present embodiment.

First described are configurations of paths of the fuel synthesis device 1. The fuel synthesis device 1 has a main path 10 through which fuel is synthesized from supplied gas and separated, and a return path 20 through which the gas remaining in a gas phase after the fuel having been separated is returned to an upstream side of a fuel synthesis catalyst 3 in the main path 10. The main path 10 has a piping 11, a piping 12, a piping 13, a piping 14, and a piping 15. Note that the fuel synthesis device 1 has an ECU (Electronic Control Unit) 60 outside these paths. The ECU 60 controls a switching valve V and various other adjustment valves, to be described below, based on a value from a $CH_4$ density detector 23 arranged in the return path 20. The ECU 60 also controls a compressor 30, a heater 40, an oil-water separator 5, and the like, based on values from various sensors (not shown).

The fuel synthesis device 1 includes a supplier 2, a fuel synthesis catalyst 3, and a gas-liquid separator 4 on a route of the main path 10, as shown in FIG. 1. The fuel synthesis device 1 includes the fuel synthesis catalyst 3 located downstream of the supplier 2, and the gas-liquid separator 4 located downstream of the fuel synthesis catalyst 3. The fuel synthesis device 1 also includes the oil-water separator 5 on the route of the main path 10 and located downstream of the gas-liquid separator 4.

The fuel synthesis device 1 also includes the compressor 30 to compress gas and the heater 40 to heat the compressed gas, between the supplier 2 and the fuel synthesis catalyst 3. The compressor 30 and heater 40 are connected to each other via the piping 12 in the main path 10. The compressor 30 compresses the gas to a pressure of 3 MPa. The heater 40 heats the gas to a temperature of 330 to 380° C. Note that the pressure and temperature of the gas can be set as required, based on characteristics of the fuel synthesis catalyst 3 and the like.

The supplier 2 is connected with the compressor 30 via the piping 11 in the main path 10. The supplier 2 supplies carbon dioxide ($CO_2$) gas and hydrogen ($H_2$) gas to the main path 10. The supplier 2 is also connected with a $CH_4$ oxidation catalyst 52 via a piping 25. The supplier 2 supplies oxygen ($O_2$) gas to the piping 25.

The $CO_2$ gas is supplied from a tank 21 storing $CO_2$ gas. The ECU 60 controls the supplied amount of the $CO_2$ gas. Note that the $CO_2$ gas may be $CO_2$ in exhaust gas, exhausted from the internal combustion engine of a vehicle such as a car, and/or in atmosphere adsorbed by an adsorbent. In this case, the absorbent may be used as a $CO_2$ tank with $CO_2$ desorbed as required.

$H_2$ gas may be obtained by electrolyzing water in an electrolysis tank 22, with the water being produced by a fuel cell or the like. $H_2$ gas obtained in this way may be stored in an $H_2$ tank (not shown) and supplied from the $H_2$ tank for use. Alternatively, $H_2$ gas may be supplied from a separate $H_2$ cylinder if required. The amount of $H_2$ gas to be supplied is controlled by the ECU 60. Note that electrolyzing water in the electrolysis tank 22 produces $O_2$. That is, the supplier 2 has a function of supplying $O_2$ gas. The fuel synthesis device 1 uses the $O_2$ gas produced in the supplier 2 for partial oxidation of $CH_4$.

The fuel synthesis catalyst 3 is located downstream of the supplier 2 and chemically reacts $CO_2$ gas and $H_2$ gas to synthesize fuel. The fuel to be synthesized is a hydrocarbon having five or more carbons ($C_{5+}$), for example, particularly gasoline. The fuel synthesis catalyst 3 is arranged in a reaction tube 31 in the main path 10. The reaction tube 31 is connected, on an upstream side thereof, to the piping 13 of the main path 10 and connected, on a downstream side thereof, to the piping 14 of the main path 10. The gas supplied from the upstream side of the fuel synthesis catalyst 3 in the main path 10 contains $CO_2$ and $H_2$. In the reaction tube 31, the $CO_2$ and $H_2$ undergo a chemical reaction (hydrogenation reaction) in a predetermined ratio. For example, an Na—$Fe_3O_4$/HZSM-5 catalyst may be used as the fuel synthesis catalyst 3, but is not limited thereto. The Na—$Fe_3O_4$/HZSM-5 catalyst is assumed to catalyze reverse water gas shift (RWGS) reaction on $Fe_3O_4$, FT synthesis reaction on $Fe_5C_2$, and oligomerization, isomerization, and aromatization at acid points on zeolite. When the Na—$Fe_3O_4$/HZSM-5 catalyst is used, hydrocarbons of $C_5$ to $C_{11}$ are obtained in maximum yield of 78%, with low production of methane ($CH_4$) and CO.

Fuel synthesis by the fuel synthesis catalyst 3 is executed by using a known technique. For example, $H_2$ metered to have a predetermined ratio of $CO_2$ to $H_2$ in the reaction tube 31 is supplied from the electrolysis tank 22 or the $H_2$ tank (not shown) to the piping 11, and the gas in the reaction tube 31 is then compressed and heated by the compressor 30 and heater 40. This causes the aforementioned RWGS reaction, FT synthesis reaction, and oligomerization and other reactions to proceed in the reaction tube 31, under the action of the fuel synthesis catalyst 3, to produce hydrocarbons (gasoline) of $C_5$ to $C_{11}$ as fuel (Equation (4) below).

$$nCO_2 + mH_2 \rightarrow C_n H_{2(m-2n)} + 2nH_2O \qquad (4)$$

The gas-liquid separator 4 is located downstream of the fuel synthesis catalyst 3, particularly between the piping 14 and piping 15 in the main path 10, and cools the fuel to a liquid and separates the liquid from the gas containing the $CO_2$ gas and $H_2$ gas, which have not been reacted in the fuel synthesis catalyst 3, and $CH_4$ gas as a side product. The gas-liquid separator 4 cools the synthesis gas containing gasoline by heat exchange and condenses the gas, to separate the above-described unreacted gas (gas phase) from the gasoline-based liquid (liquid phase (hydrocarbons of $C_{5+}$)). Alternatively, the gas-liquid separator 4 may separate the synthesis gas through membrane separation, to separate the gasoline-based liquid (liquid phase). The gasoline-based liquid phase, which has been separated by the gas-liquid separator 4, is fed through the piping 15 to the oil-water separator 5. The gas phase separated by the gas-liquid separator 4 contains hydrocarbons of $CH_4$ and $C_{2-4}$ as side products, unreacted $CO_2$ and $H_2$, and unrecovered gasoline and water ($H_2O$). The gas separated as gas phase in the gas-liquid separator 4 is fed through the return path 20 to a point upstream of the fuel synthesis catalyst 3, such as to the compressor 30, and used again for fuel synthesis.

The oil-water separator 5 separates gasoline and water in the liquid phase from each other, using the difference in boiling points. The oil-water separator 5 heats the liquid phase to 35° C. or more but less than 100° C., for example. This allows for obtaining gasoline evaporated from the liquid phase, which is either left as gas or liquefied and fed to a fuel tank, not shown, through the piping 16. The remaining liquid phase is almost entirely water ($H_2O$) and is discharged outside through the piping 17. Note that the heating temperature is desirably set such as to 40° C. or more, 50° C. or more, and 60° C. or more, from the viewpoint of evaporating gasoline. Additionally, the heating temperature may be set such as to 90° C. or less, 80° C. or less, and 70° C. or less, from the viewpoint of reducing water contamination. Alternatively, the heating temperature may be set to multiple temperature ranges in consideration of fractional distillation of gasoline.

In the present embodiment, a bypass path 50 is provided in the return path 20. The bypass path 50 bypasses, and merges downstream of, the return path 20. The bypass path 50 includes, on a route thereof, a $CH_4$ separator 51 to separate $CH_4$ and the $CH_4$ oxidation catalyst 52 to oxidize $CH_4$ separated by the $CH_4$ separator 51.

For example, a molecular sieve may be used as the $CH_4$ separator 51. The $CH_4$ transmitting through, and separated by, the $CH_4$ separator 51 is fed via a piping 53 to the $CH_4$ oxidation catalyst 52. Note that the gas phase transmitting through, and separated by, the $CH_4$ separator 51 (transmitted gas phase) may contain $H_2$, and this $H_2$ is also fed to the $CH_4$ oxidation catalyst 52, along with $CH_4$. In contrast, the gas phase which has not transmitted through the $CH_4$ separator 51 (retained gas phase) may contain hydrocarbons of $CO_2$ and $C_{2-4}$. The hydrocarbons of $CO_2$ and $C_{2-4}$ are fed to the return path 20 via a piping 54. These hydrocarbons of $CO_2$ and $C_{2-4}$ are then fed to a point upstream of the fuel synthesis catalyst 3, such as the compressor 30, and are used again for fuel synthesis.

The $CH_4$ oxidation catalyst 52 causes $CH_4$ to be incompletely combusted at an oxygen density lower than the theoretical oxygen content required for complete combustion. For example, a Pd/$Al_2O_3$ catalyst may be used as the $CH_4$ oxidation catalyst 52. The Pd/$Al_2O_3$ catalyst reacts $CH_4$ and $O_2$ in a predetermined ratio under conditions of 400° C., for example, to partially oxidize $CH_4$ to produce CO and $H_2$ (Equation (5)).

$$CH_4 + \tfrac{1}{2}O_2 \rightarrow CO + 2H_2 \qquad (5)$$

The CO and $H_2$, produced as above, and the $H_2$, fed to the $CH_4$ oxidation catalyst 52 as being unreacted, are fed to the return path 20 via a piping 55. The CO and $H_2$ are then fed to the point upstream of the fuel synthesis catalyst 3, such as the compressor 30, along with the hydrocarbons of $CO_2$ and $C_{2-4}$, and are used again for fuel synthesis.

The switching valve V is provided at the junction of the return path 20 and the bypass path 50. The switching valve V selectively switches between communication with the return path 20 and communication with the bypass path 50.

In the return path 20, a $CH_4$ density detector 23 is placed between the gas-liquid separator 4 and the switching valve V. The $CH_4$ density detector 23 detects density of $CH_4$ contained in the gas separated by the gas-liquid separator 4. The $CH_4$ density detector 23 can be an HC analyzer or an exhaust gas detector to detect the density of hydrocarbons. The $CH_4$ density detector 23 outputs density (detected value) of the $CH_4$ to the ECU 60. The ECU 60 includes a calculator (not shown) to calculate, based on the inputted density of $CH_4$, an amount of $O_2$ required for partially oxidizing the $CH_4$ in the $CH_4$ oxidation catalyst 52. The calculator is implemented by a CPU (Central Processing Unit, not shown) of the ECU 60 executing a program necessary for the calculation. The ECU 60 then outputs the required amount of $O_2$ calculated above to a mass flow controller MFC.

The $CH_4$ oxidation catalyst 52 is connected with the supplier 2 (particularly the electrolysis tank 22) via the piping 25 as described above. The $O_2$ generated in the electrolysis tank 22 is fed via the piping 25 to the $CH_4$ oxidation catalyst 52 ($O_2$ supplier). The piping 25 is provided with the mass flow controller MFC. The mass flow controller MFC meters mass flow of $O_2$ for flow rate control.

The mass flow controller MFC feeds $O_2$ to the $CH_4$ oxidation catalyst 52, while controlling a flow rate of $O_2$ supplied from the electrolysis tank 22, based on the amount of $O_2$ calculated by the ECU 60. This allows for suitably executing partial oxidation of $CH_4$ in the $CH_4$ oxidation catalyst 52.

In the present embodiment, whether the switching valve V communicates with the return path 20 or the bypass path 50 is controlled based on the density of $CH_4$ detected by the $CH_4$ density detector 23. The ECU 60 controls the switching valve V. In this way, the fuel synthesis device 1 controls the switching valve V based on the density of $CH_4$ remaining in the device to partially oxidize the $CH_4$ and returns the gas (CO) produced by oxidation to the point upstream of the fuel synthesis catalyst 3 (between the supplier 2 and the fuel synthesis catalyst 3).

This allows the fuel synthesis device 1 to use CO as a feedstock in the fuel synthesis catalyst 3, to synthesize fuel (hydrocarbon of $C_{5+}$) for sufficiently growing carbon chain. That is, the fuel synthesis device 1 effectively utilizes $CH_4$ produced as a side product in the fuel synthesis catalyst 3, to synthesize fuel. The fuel synthesis device 1 uses carbon dioxide to synthesize fuel (gasoline), resulted in reducing carbon dioxide and its negative impact on the global environment.

The fuel synthesis device 1 may cause the switching valve V to communicate with the bypass path 50, on the condition that the density of $CH_4$ detected by the $CH_4$ density detector 23 becomes equal to or greater than a predetermined value at which synthesis of the fuel is blocked. The predetermined value may suitably be set in consideration of performance of the fuel synthesis catalyst 3.

In such an embodiment, the ECU 60 of the fuel synthesis device 1, on the condition that density of the $CH_4$ remaining in the device increases to become equal to or greater than the predetermined value at which synthesis of the fuel is blocked, causes the switching valve V to be switched to communicate with the bypass path 50 to allow the $CH_4$ to be partially oxidized, so that the gas (CO) produced by oxidation is returned to the point upstream of the fuel synthesis catalyst 3. Accordingly, the fuel synthesis device 1 uses CO as a feedstock in the fuel synthesis catalyst to synthesize fuel (hydrocarbon of $C_{5+}$) for sufficiently growing carbon chain. Note that the ECU 60 in this embodiment, on the condition that the density of the $CH_4$ is less than the predetermined density, causes the switching valve V to remain unmoved to keep communicating with the return path 20. The switching valve V communicates with the return path 20 at a time of starting operation and during normal operation. The unreacted $CO_2$ and $H_2$, $CH_4$ as a side product, and hydrocarbon of $C_{2-4}$ are then fed (returned) to the point upstream of the fuel synthesis catalyst 3, particularly to the compressor 30. In this way, the $CH_4$ oxidation catalyst 52 is not used to prevent the $CH_4$ oxidation catalyst 52 from being degraded, so that the life of the $CH_4$ oxidation catalyst 52 is extended.

Figure 2:
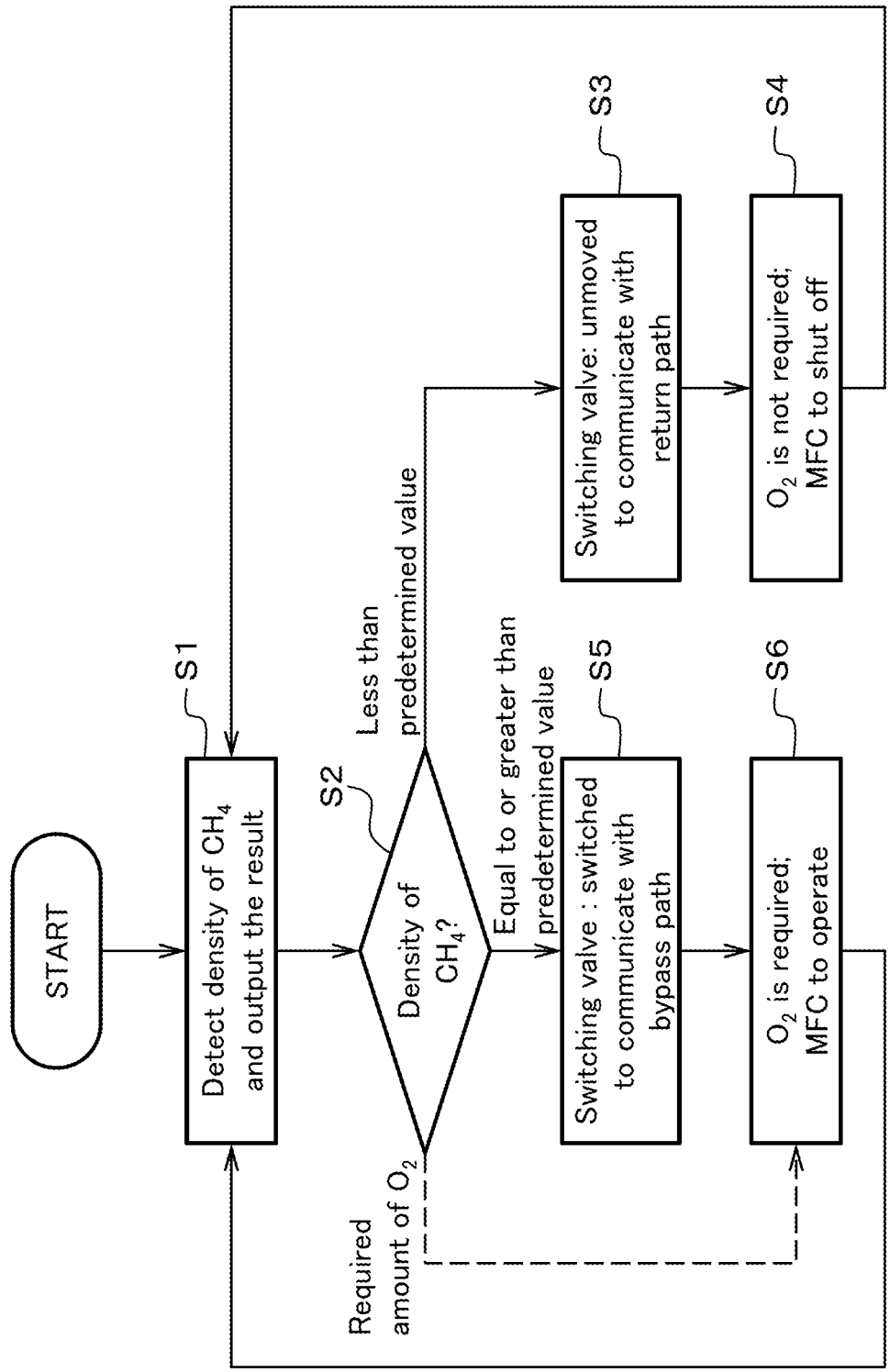
FIG. 2 is a flowchart of controlling switching between a return path and a bypass path in the fuel synthesis device according to the present embodiment.
Figure 3:
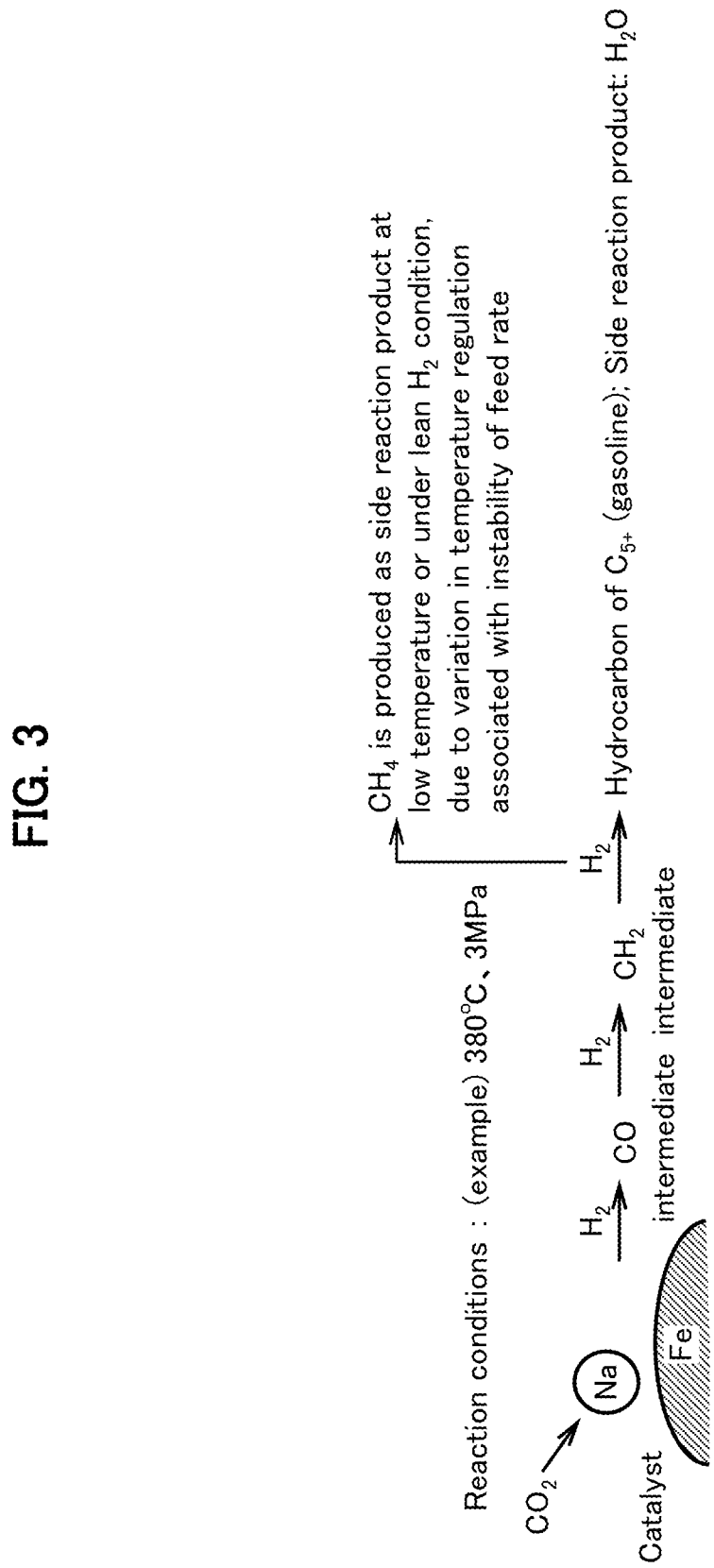
FIG. 3 illustrates a mechanism of synthesizing fuel in Direct-FT.

Next, a description is given of a preferable embodiment of controlling switching between the return path 20 and the bypass path 50 in the fuel synthesis device 1 of the present embodiment, with reference to FIG. 2. FIG. 2 is a flowchart of controlling switching between the return path 20 and the bypass path 50 in the fuel synthesis device 1 of the present embodiment.

The fuel synthesis device 1 starts operation, as shown in FIG. 2. The supplier 2, the compressor 30, the heater 40, the fuel synthesis catalyst 3, the gas-liquid separator 4, and the oil-water separator 5 operates as described above, to produce hydrocarbon of $C_{5+}$ as fuel. The fuel synthesis catalyst 3 produces $CH_4$ as a side product, in association with fuel being produced.

Then, the $CH_4$ density detector 23 detects density of $CH_4$ as a side product, which has been separated by the gas-liquid separator 4, and outputs the density of $CH_4$ to the ECU 60 (step S1). The ECU 60 determines whether the density of $CH_4$ detected by the $CH_4$ density detector 23 is less than the predetermined value, or equal to or greater than the predetermined value (step S2).

The ECU 60, on the condition that the density of $CH_4$ has been less than the predetermined value in step S2, causes the switching valve V to remain unmoved to keep communicating with the return path 20 (step S3). In this case, there is no need of supplying $O_2$ to the $CH_4$ oxidation catalyst 52, so that the ECU 60 controls the mass flow controller MFC to shut off the flow (step S4). The processing then returns to step S1 so that the fuel synthesis device 1 operates and the $CH_4$ density detector 23 detects the density of $CH_4$ as a side product.

In contrast, the ECU 60, on the condition that the density of $CH_4$ is equal to or greater than the predetermined value, causes the switching valve V to communicate with the bypass path 50 (step S5). Concurrently in step S2, the ECU 60 causes the calculator to calculate an amount of $O_2$ required for partially oxidizing $CH_4$ in the $CH_4$ oxidation catalyst 52, based on the density of $CH_4$, and outputs the required amount of $O_2$ calculated above to the mass flow controller MFC. The ECU 60 then causes the mass flow controller MFC to operate to supply $O_2$ to the $CH_4$ oxidation catalyst 52, while controlling the flow rate of $O_2$ supplied from the electrolysis tank 22, based on the amount of $O_2$ calculated by the ECU 60 (step S6). Upon the required amount of $O_2$ having been supplied, the processing returns to step S1 so that the fuel synthesis device 1 operates and the $CH_4$ density detector 23 detects the density of $CH_4$ as a side product.

As described hereinabove, the fuel synthesis device 1 of the present embodiment controls whether the switching valve V communicates with the return path 20 or the bypass path 50, based on the density of $CH_4$ detected by the $CH_4$ density detector 23. The fuel synthesis device 1 thus controls the switching valve V based on the density of $CH_4$, staying in the device, to cause $CH_4$ to be partially oxidized and return gas (CO) produced by oxidation to the point upstream of the fuel synthesis catalyst 3 (between the supplier 2 and the fuel synthesis catalyst 3). This allows the fuel synthesis device 1 to use CO as a feedstock in the fuel synthesis catalyst 3 to synthesize fuel (hydrocarbon of $C_{5+}$) for sufficiently growing carbon chain.

The present invention is not limited to the above-described embodiment and can be implemented in various embodiments. In addition, said embodiments can be combined to the extent structurally feasible.

LIST OF REFERENCE SIGNS

1: fuel synthesis device, 2: supplier, 3: fuel synthesis catalyst, 4: gas-liquid separator, 5: oil-water separator, 10: main path, 11 to 17: piping, 20: return path, 21: tank, 22: electrolysis tank, 23: $CH_4$ density detector, 25: piping, 30: compressor, 31: reaction tube, 40: heater, 50: bypass path, 51: $CH_4$ separator, 52: $CH_4$ oxidation catalyst, 53 to 55: piping, 60: ECU, MFC: mass flow controller, and V: switching valve.

What is claimed is:

1. A fuel synthesis device comprising:
a supplier arranged upstream of a main path and configured to supply $CO_2$ gas and $H_2$ gas;
a fuel synthesis catalyst located downstream of the supplier and configured to chemically react the $CO_2$ gas and the $H_2$ gas to synthesize fuel;
a gas-liquid separator arranged downstream of the fuel synthesis catalyst and configured to liquefy the fuel into liquid and separate the liquid from a gas containing the $CO_2$ gas and the $H_2$ gas, which have not yet reacted with the fuel synthesis catalyst, and gas of $CH_4$ as a side product;
a return path configured to return the gas separated by the gas-liquid separator to a point in a flow path between the supplier and the fuel synthesis catalyst;
a bypass path configured to bypass, and merge downstream of, the return path, and including a $CH_4$ separator to separate the $CH_4$ and a $CH_4$ oxidation catalyst to oxidize the $CH_4$ separated by the $CH_4$ separator;
a switching valve provided at a junction of the return path and the bypass path and configured to selectively switch between communication with the return path and communication with the bypass path; and
a $CH_4$ density detector arranged in the return path and configured to detect density of $CH_4$ contained in the gas separated by the gas-liquid separator,
wherein whether the switching valve communicates with the return path or the bypass path is controlled based on the density of $CH_4$ detected by the $CH_4$ density detector.

2. The fuel synthesis device according to claim 1, wherein the switching valve is controlled to communicate with the bypass path, on the condition that the density of $CH_4$ detected by the $CH_4$ density detector becomes equal to or greater than a predetermined value at which synthesis of the fuel is blocked.

3. The fuel synthesis device according to claim 1, wherein the supplier further has a function of supplying $O_2$ gas, and
the fuel synthesis device includes:
a calculator configured to calculate an amount of $O_2$ required for oxidation, based on the density of $CH_4$ detected by the $CH_4$ density detector; and
an $O_2$ supplier configured to supply the $O_2$ gas from the supplier to the $CH_4$ oxidation catalyst, based on the amount of $O_2$ calculated by the calculator.

* * * * *